United States Patent [19]

Bentley

[11] 4,164,536

[45] Aug. 14, 1979

[54] METHOD AND APPARATUS FOR THE MANUFACTURE OF FIBROUS CASING

[75] Inventor: James G. Bentley, Veedersburg, Ind.

[73] Assignee: Teepak, Inc., Chicago, Ill.

[21] Appl. No.: 897,327

[22] Filed: Apr. 18, 1978

[51] Int. Cl.² ............................ B29F 3/10; D01F 1/08
[52] U.S. Cl. .................................... 264/173; 264/188; 425/71; 425/326.1
[58] Field of Search ............... 264/188, 195, 173, 209, 264/89, 95; 425/71, 326.1, 94

[56] References Cited

U.S. PATENT DOCUMENTS

| | | | |
|---|---|---|---|
| 3,679,437 | 5/1969 | Oppenheimer | 264/173 |
| 3,833,022 | 9/1974 | Turbak | 264/173 |

*Primary Examiner*—Sam Silverberg

*Attorney, Agent, or Firm*—Paul Shapiro; J. E. Kerwin; C. E. Brown

[57] ABSTRACT

Fibrous casing is manufactured wherein a paper tube is passed downwardly over a mandrel and impregnated with viscose. The interior and exterior sidewalls of the tube are contacted with a coagulating liquid to regenerate cellulose on the tube walls. Spent coagulating liquid is withdrawn from the tube interior by the imposition of a pressure differential on the liquid. Withdrawal of the liquid also causes the walls of the descending tube to be drawn into disadvantageous wiping contact with the mandrel surface. This wiping contact is reduced or substantially eliminated by introducing a gas, e.g., air, at a low positive pressure, into the spent liquid being withdrawn from the tube to form a fluid mixture having a specific gravity less than that of the liquid.

9 Claims, 3 Drawing Figures

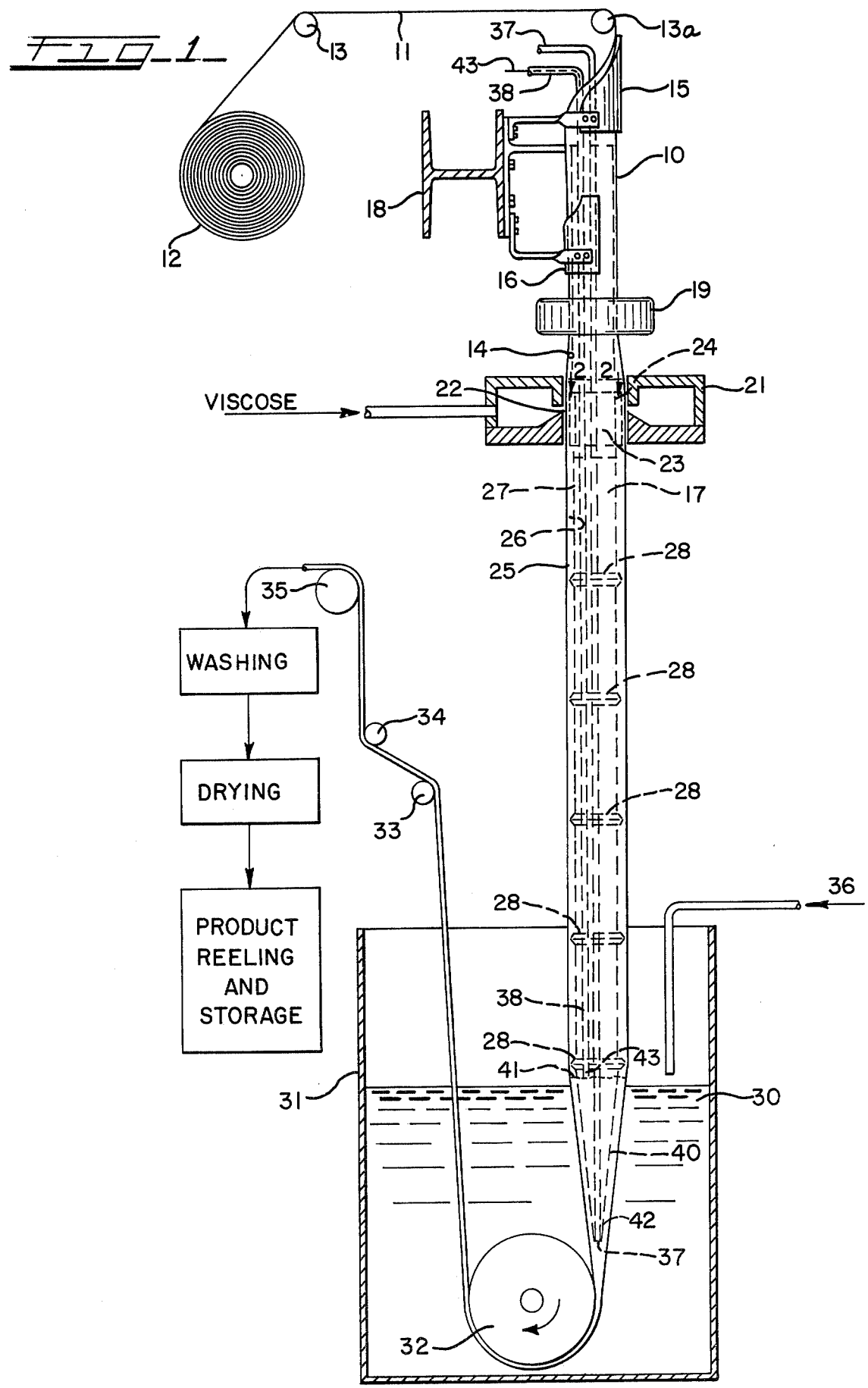

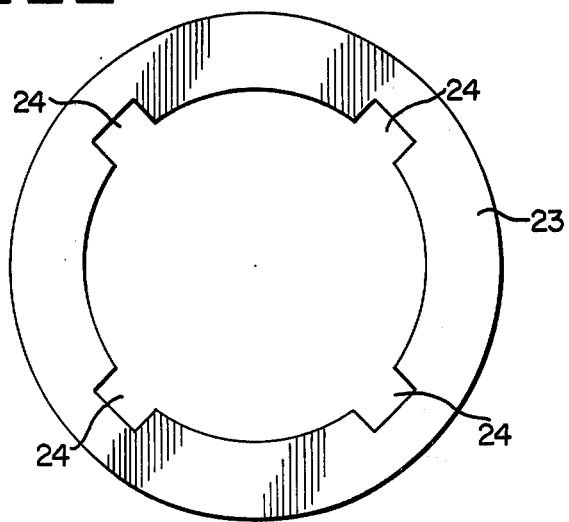
FIG_2_
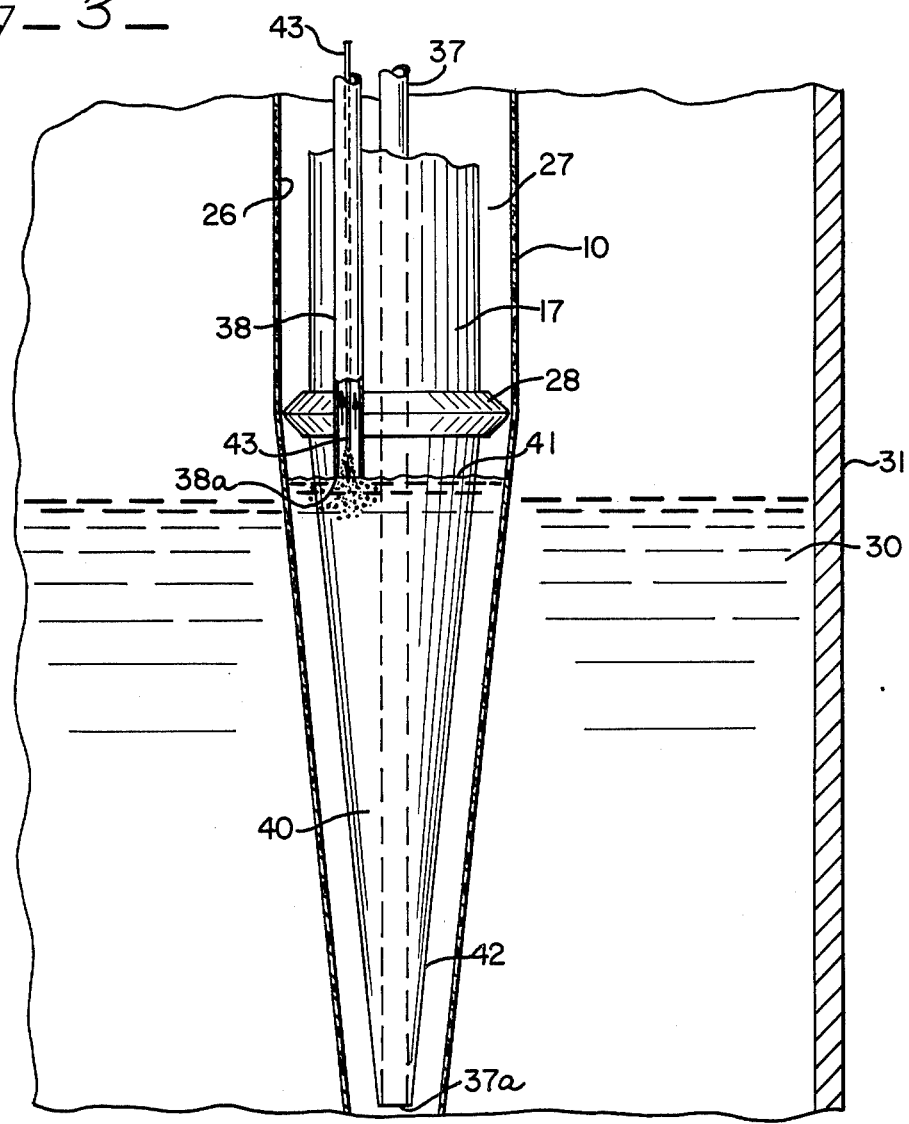
FIG_3_

METHOD AND APPARATUS FOR THE MANUFACTURE OF FIBROUS CASING

BACKGROUND OF THE INVENTION

1. Field of the Invention

This invention relates to a method and apparatus for the manufacture of fibrous casings.

2. Description of the Prior Art

In the preparation of sausages by meat packers, a sausage emulsion is inserted into a natural or synthetic sausage casing which is subsequently tied off at each end and cooked. One type of synthetic casing provided to the trade is known as fibrous casing. Fibrous casing is composed of cellulosic fibers, generally in the form of a paper, which are impregnated and held together by regenerated cellulose. The paper which is used is usually a saturating tissue, preferably a long fiber hemp paper, which is formed into a tube and is impregnated with viscose solution. After the interstices of the paper have been filled with viscose solution and a coating of the solution is formed thereon, the tube is subjected to a coagulating bath to regenerate cellulose within and upon the paper. The dried product is a paper reinforced regenerated cellulose casing having relatively high strength and relatively low stretch.

When the above-disclosed procedure for the manufacture of fibrous casing is followed, difficulties are encountered during the step of viscose impregnation of the paper. In the procedure for impregnating the paper tube with viscose, a paper sheet formed into the shape of a tube proceeds downwardly over a hollow mandrel which acts to maintain the paper in tubular form during the viscose impregnation. The mandrel is further provided with a plurality of metal slip rings which function to keep the viscose impregnated paper tube from binding against the outside wall of the mandrel as the tube moves downwardly. After passage of the viscose impregnated tube over the mandrel, the tube enters a coagulating bath wherein the viscose on the outer surface of the tube is coagulated and regenerated. Regeneration of viscose on the interior surface of the tube is accomplished by feeding coagulation liquid to the interior tube portion present at the bottom of the mandrel. Thereafter, the tube is removed from the bath and washed and dried to obtain the desired fibrous casing.

During the regeneration of cellulose on the tube interior, spent coagulation liquid accumulated within the lower interior portion of the tube is withdrawn therefrom by means of a vacuum line which extends through the entire length of the hollow mandrel and into the area of the tube interior where the spent liquid has accumulated. The imposition of the vacuum creates a pressure differential which acts on the spent liquid to cause it to flow upwardly in the vacuum line. The imposition of the vacuum to effect removal of the spent liquid has also been found to create a zone of negative pressure in the space between the inner surface of the tube and the outer surface of the mandrel as the air in the space is removed therefrom and drawn into the liquid being withdrawn from the tube. The negative pressure created between the inner tube surface and outer mandrel surface causes the tube to be drawn into wiping contact with the rings mounted on the mandrel. Contact of the internal wall of the wet viscose-coated tube with the rings causes a portion of the viscose coated on the tube wall to be scraped therefrom and collected on the rings. After continued passage of the wet impregnated tubes over the rings under these conditions, there results an excessive accumulation of viscose which eventually breaks loose from the rings and deposits on the internal surfaces of the tube which result in "viscose spots" in the finished casing, i.e., areas of uneven coating. Poor yields of casing also result as the accumulation of viscose on the rings creates a drag force on the descending tube which causes the weakly sealed wet casing to rupture and tear apart.

SUMMARY OF THE INVENTION

The formation of viscose spots on the inner surfaces of fibrous casing during impregnation of the paper tube due to contact of the surfaces with the mandrel is substantially reduced and the yields of the casing are improved in accordance with the practice of the present invention wherein paper shaped in the form of a tube is passed downwardly over the mandrel and impregnated with viscose. The viscose is regenerated on the tube walls by applying a coagulating liquid to the interior and exterior surfaces of the tube. Spent coagulation liquid is withdrawn from the interior of the tube by imposing a pressure differential on the liquid. As the liquid is withdrawn from within the tube, a gas is introduced into the liquid to form a fluid mixture having a specific gravity less than that of the liquid. By reducing the specific gravity of the liquid being withdrawn from the tube, air is prevented from being drawn from the space between the tube and mandrel, with the result that the zone of negative pressure previously existant therein is substantially eliminated, thereby effecting a substantial reduction in wiping contact of the tube walls with the mandrel surface.

FIG. 1 is a diagrammatic view of the apparatus of the invention;

FIG. 2 is a top plan view of an element of the apparatus taken along the line 2—2 of FIG. 1;

FIG. 3 is a greatly enlarged fragmentary view of a portion of the apparatus of FIG. 1.

In the drawing, a ribbon of paper 11 of suitable width which is formed of natural cellulosic fibers, and which is preferably a long fiber, hemp paper weighing 10–20 pounds per ream, is fed from roll 12 and passed over rollers 13 and 13a and around guides 15 and 16 which form the paper into a cylindrical tube 10 with the overlapping edges forming a seam.

The seamed paper tube 10 proceeds over hollow mandrel 17 which may be a steel pipe having an outside diameter of one to seven inches, more or less, depending upon the size of the tube or casing which is to be produced. The mandrel 17 may be of a suitable length, generally about 30 feet long, and, as shown, can be suspended from a suitable support such as an I-beam 18 or the like. The paper tube 10 passes downwardly over the mandrel 17, through a forming ring 19 which is a metallic ring having an inside diameter slightly larger than the diameter of the paper tube passing through it. The forming ring 19 functions to maintain the paper in the form of a tube until it reaches the coating die 21.

The overlapped edges of the tube 10 form a seam which is weakly bonded with viscose applied to the overlapped edges of the tube 10 by means of pipe 14 connected to a source of viscose, not shown. The seam having viscose applied thereto is highly susceptible to rupture; the seam being strongly bonded only after the cellulose regeneration and drying steps of the fibrous casing manufacturing process are completed.

Coating die 21 is a hollow annular structure of metal or the like and contains an annular opening 22, circumferentially of its inner face, through which viscose solution is applied to the outer surface of the downwardly moving paper tube 10. Viscose solution is supplied under positive pressure from the chamber of die 21 through the annular slit 22 to thoroughly coat the paper of the tube as well as thoroughly impregnate both the interior and exterior sidewalls of the paper of the tube 10 which moves downwardly through the die.

A sleeve 23, formed of a synthetic resin material such as Nylon, Teflon or Delron, mounted on the mandrel 17, functions to effect more uniform application of viscose through the orifice 22 as the paper tube 10 passes downwardly thereover. The sleeve 23 has provided on its internal surfaces a plurality of slots 24 through which atmospheric air is allowed entry into the space 25 between the internal surface 26 of the tube 10 and the external mandrel surface 27. The air admitted through the slots 23 into the tube 10 acts to reduce any negative pressure existing between the interior walls 26 of the tube 10 and outer surface 27 of the mandrel 17.

A plurality of slip rings 28 are positioned on mandrel 17 at preselected intervals. The slip rings 28 are preferably shrunk onto the mandrel at about 3 foot intervals and serve to keep the inside wall of the viscose-impregnated paper tube from scraping against the outside wall of mandrel 17 as the tube moves downwardly.

Continuing in its downward movement, the viscose-impregnated paper tube 10 enters coagulating bath 30 contained in vessel 31. Coagulating bath 30 contains about 5 percent sulfuric acid and various salts. On contact with the acid bath, the viscose coated upon and impregnated on the outside surface of the paper tube 10 is coagulated and regenerated. The conversion of viscose to regenerated cellulose begins and continues within the bath as the tube moves around roller 32 and continues as the tube moves over and under wiper rods 33 and 34, rollers 35 and then through washing baths and drying tunnels not shown here, but being substantially the same as those used in the art of making regenerated cellulose casings, as exemplified in U.S. Pat. No. 1,927,225 and related patents. For convenience in understanding the overall invention, the steps of washing, drying and reeling, and storage of the product casing are shown diagrammatically without reference to any particular apparatus for accomplishing those steps.

In carrying out the acid regeneration of cellulose in the paper tube 10, acid for the bath 30 is pumped through pipe 36, from a source not shown, to effect the regeneration of cellulose from the viscose applied to the external walls of the tube 10. The same kind and concentration of acid is pumped to the interior of the casing through the mandrel 17 through coagulation liquid inlet pipe 37 located interiorly of the hollow mandrel and which extends the entire length of the mandrel 17. Spent coagulation liquid 41 within the tube 10 is continuously withdrawn by pulling a vacuum through pipe 38 at a rate which is balanced by incoming acid. Spent liquid is withdrawn from the interior of the tube 10 through the length of mandrel 17 and is ejected from the opposite end of vacuum line 38 into a collection means, not shown. The lower end 37a of acid inlet pipe 37 depends into the lower tapered end 42 of the mandrel 17 to feed coagulating liquid to the lower interior end portion of the descending tube 10.

The spent coagulation liquid 41 is allowed to collect within the interior of the tube 10 to a level within the tube which is slightly above, e.g., 0.1–0.5 inch, the level of the coagulation liquid in the bath 30. The lower or inlet end 38a of the vacuum pipe 38 extends just to the liquid level of the spent coagulation liquid 41 accumulated within the tube 10.

Running through the interior of vacuum pipe 38 is gas line 43. The end of the gas line 43 is located above the liquid level of the spent coagulation liquid 41, and generally about 2–20 inches above the coagulation bath.

A gas, e.g., $CO_2$, $N_2$ and preferably air, is admitted to the gas line 43, from a source not shown, at a slight positive pressure, e.g., about 1 to about 5 psi, and mixes with the spent coagulation liquid 41 and becomes entrained in the liquid as the liquid is being drawn upwardly into the vacuum pipe 38.

The mixing of the gas with the spent coagulation liquid has been found to substantially eliminate the wiping contact of the paper tube 10 with the mandrel 17 as the tube descends down the mandrel.

It is believed that the substantial elimination of tube wall contact with the mandrel is due to the substantial elimination of the negative pressure normally created between the interior tube walls and the mandrel during the manufacture of the casing. This negative pressure is believed to be caused by air being withdrawn from the space between the tube walls and the mandrel as a result of the vacuum withdrawal of the spent coagulation liquid from the interior of the tube 10. Because of the high specific gravity of spent coagulation liquid, e.g., 1.26 grams/cubic centimeter, conventional vacuum systems cannot lift the spent liquid through the length of commercially used mandrels which may be 30 feet or more in length. In order to accomplish the lifting of the spent liquid through the 30 foot length, the vacuum system, in drawing the spent liquid from the tube interior, also induces air to be drawn from the space 25 between the mandrel surface 27 and tube interior surface 26. This air then becomes entrained in the spent liquid 41, forming a fluid mixture which has a lesser density of a value which enables the fluid to be lifted through the 30 foot length. It is this drawing of air into entrainment in the spent liquid to form a fluid having a lesser density than the coagulation liquid which is believed to be the causitive factor responsible for the zone of negative pressure normally existant between the interior tube walls and the mandrel surface.

In the practice of the present invention, the gas introduced into spent liquid 41 as it is withdrawn from the tube interior substitutes for the air normally withdrawn from the space 25 between the mandrel outer surface 27 and the tube interior surface 26 for entrainment in the spent liquid, thereby substantiallly eliminating the negative pressure conventionally encountered in the viscose impregnation step of the fibrous casing manufacturing process.

A further advantage of the practice of the present invention is that by adjusting the gas supply fed to the spent coagulation liquid, the rate of removal of the liquid can be controlled with great precision. Thus, in a commercial fibrous casing manufacturing facility where the vacuum source available for plant use varies over a considerable range, by the practice of the present invention there is an interaction between the applied vacuum and the volume of gas entrained in the spent coagulation liquid such that the volume of liquid removed from the interior of the tube tends to remain constant regardless of vacuum variation. Thus, for a given supply of gas, if the vacuum supplied to tube increases, the rate of fluid (i.e., gas plus spent liquid) volume removed from the tube increases, but since the volume percentage of gas in the fluid also increases due to the increase in vacuum, the net effect produced is that the volume of liquid removed remains substantially the same, as the volume fraction of liquid in the fluid being removed decreases. Conversely, if the vacuum imposed on the spent coagulation liquid decreases, the rate of fluid volume decreases, but since the volume percentage of gas in the fluid decreases, the net effect is the same as before, namely, the volume of liquid removed remains substantially the same as the volume fraction of liquid in the fluid increases.

In the preparation of casing in accordance with this process, the speed of the casing in its downward movement is approximately 20–50 feet per minute, more or less, and the contact time in the acid bath 23 is of the order of 10–40 seconds.

The fibrous casing which is produced in this process is a tough, strong casing useful in the preparation of large sausages such as bolognas and the like, is substantially free of viscose spots and can be manufactured in yields approaching 90%.

What is claimed is:

1. A process for the manufacture of fibrous casing from a fibrous tube having interior and exterior surfaces, which process comprises sleeving the tube over a mandrel and providing a space therebetween;

advancing the tube over a mandrel;

impregnating the tube with viscose while the tube is advanced over the mandrel;

regenerating cellulose from the viscose impregnated tube by applying a coagulating liquid to the interior and exterior surfaces of the tube;

withdrawing the liquid from within the tube by imposing a pressure differential on the liquid;

introducing a gas at a point above the liquid level as the liquid is being withdrawn from within the tube to cause the gas to be entrained in the liquid to form a fluid mixture having a specific gravity less than that of the liquid so as to prevent air from being withdrawn from the space in order that the tube remain in spaced relation to the mandrel; and then collecting the fibrous casing.

2. The process of claim 1 wherein the gas is introduced into the liquid at a low positive pressure.

3. The process of claim 1 wherein the gas is introduced into the liquid at a pressure of about 1 to about 5 psi.

4. The process of claim 1 wherein the gas is air.

5. An apparatus for the manufacture of fibrous casing from a fibrous tube having interior and exterior sidewalls which comprises in combination, means for advancing the tube, a mandrel over which the tube is downwardly advanced in spaced relation thereto, means for impregnating the interstices of the tube with viscose while the tube to cause the gas to be entrained in the liquid being withdrawn is advanced over the mandrel, means for applying a coagulating liquid to the interior and exterior sidewalls of the tube, means for imposing a pressure differential on the liquid to withdraw the liquid from the interior of the tube, means for introducing a gas at a point above the liquid level as the liquid is withdrawn from the tube and means for collecting the fibrous casing.

6. The apparatus of claim 5 wherein said liquid application means applies the liquid to the interior of the tube to a predetermined level and the pressure differential means is comprised of a vacuum line having an inlet end disposed in withdrawing relation to the liquid level.

7. The apparatus of claim 6 wherein the gas introduction means is comprised of a pressure line disposed in a gas supplying relationship to the vacuum line.

8. The apparatus of claim 6 wherein the vacuum line inlet end is disposed in immersed relation to the liquid level.

9. The apparatus of claim 8 wherein the gas introduction means is disposed in spaced relation to the liquid level.

* * * * *